Feb. 26, 1957     A. J. RINALDI ET AL     2,782,976
LAMINATES AND LAMINATED PRODUCTS
Filed Dec. 29, 1952
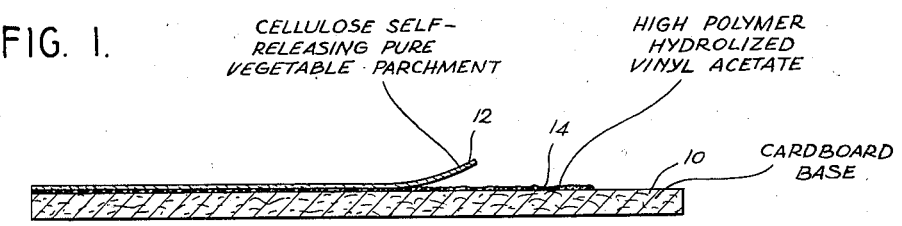
FIG. 1.
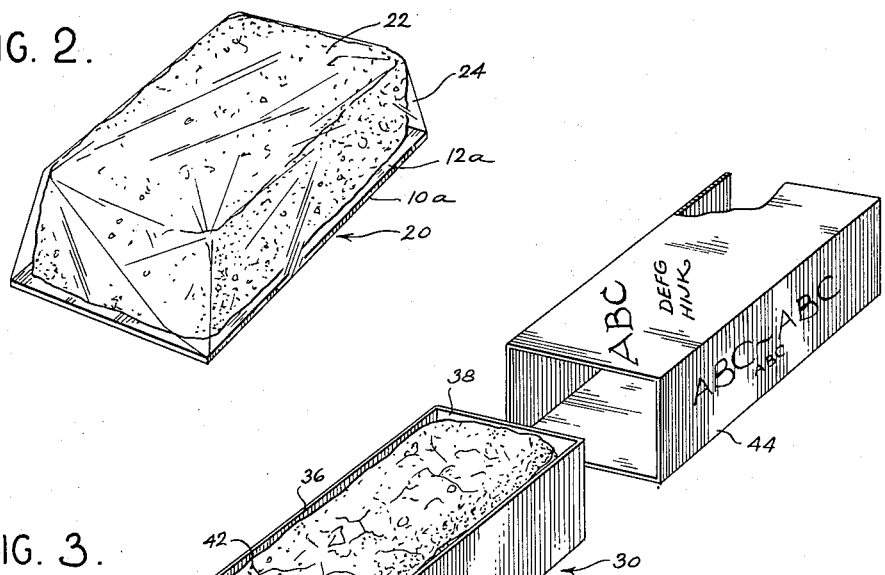
FIG. 2.
FIG. 3.
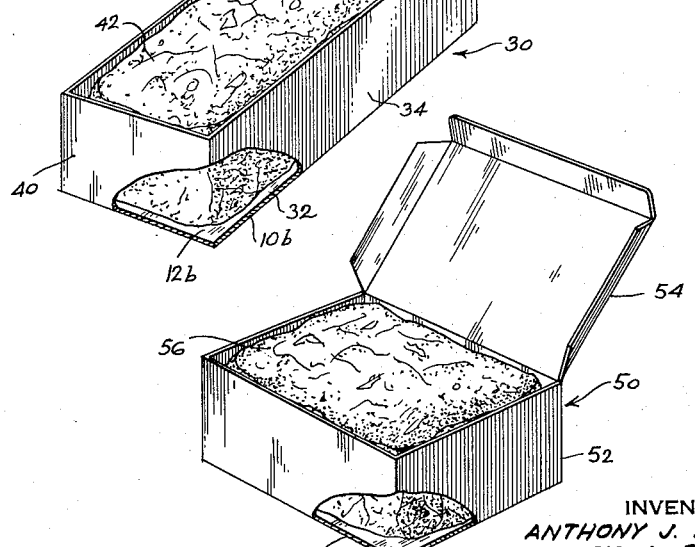
FIG. 4.
INVENTOR
ANTHONY J. RINALDI
FRANCIS A. ROMANO
By Morton Amster
ATTORNEY

2,782,976

LAMINATES AND LAMINATED PRODUCTS

Anthony J. Rinaldi, Demarest, and Francis A. Romano, Englewood, N. J.

Application December 29, 1952, Serial No. 328,334

3 Claims. (Cl. 229—3.5)

The present invention relates to laminates and laminated products, particularly to laminates capable of withstanding temperatures encountered in baking edible products; and to pallets, trays, boxes and the like fabricated in whole or in part of such laminates, successively enabling baking, shipping, merchandizing and displaying of the products.

With the advent of pre-cooking various products and foods prior to distribution, there has developed a pressing need for simplified techniques in the processing and handling of these food stuffs. Illustrative of the problem is the approach followed by the well-established baking industry in commercially preparing baked goods such as bread, rolls, cake and the like. Subsequent to baking in a well known manner and employing conventional greased trays, the baked products are removed for appropriate packaging prior to transportation to consumer outlets. The shortcomings of this technique are manifest, among them the need of handling subsequent to the actual baking, the increased risk of contamination incident to the multiple handling of the baked products, and the need for fairly complicated handling machinery for effectuating packaging.

Accordingly, it is an object of the present invention to provide novel means by which one or more of the aforesaid disadvantages are overcome. Specifically, it is among the objects of the present invention to provide laminated products which may serve successively as a support during baking, shipping, and merchandizing.

As a feature of the present invention, there is provided a novel laminate having physical properties compatible with the widely different requirements imposed when serving as a support during commercial and home baking at temperatures ranging up to 500° F. and during handling and shipment.

As a still further feature of the present invention, there is provided a novel laminate of the aforesaid character which can be incorporated into almost any type of receptacle or container, among them pallets and trays, with or without transparent wrappers, and collapsible boxes and cartons.

Many other objects, features and advantages of the present invention will be understood by those skilled in the art by reference to the description of preferred embodiments in accordance with the present invention, the specific description pointing out the exact and complete manner in which we have made a patentable advance in the arts and sciences. The description will be best understood by reference to the drawing, wherein:

Fig. 1 is a sectional view through a laminate embodying features of the present invention;

Fig. 2 is a perspective view of the laminate of Fig. 1 serving as the base of a package including a transparent wrapper around goods baked directly on the base;

Fig. 3 is a perspective view, with parts broken away and sectioned, showing an open-topped receptacle fabricated of the laminate of Fig. 1, and, Fig. 4 is a perspective view with parts broken away and sectioned, showing a collapsible box fabricated of the laminate of Fig. 1.

Referring now specifically to the drawing, there is shown in Fig. 1 a laminate embodying features of the present invention which includes a semi-rigid cellulosic base 10, fabricated of cardboard, chip board, pulp board or similar paper base material.

Superimposed upon and substantially co-extensive with the base 10 is a layer 12 of cellulose, self-releasing pure vegetable parchment. This layer is a moderately parchmentized grade of vegetable parchment containing a releasing ingredient such as compounds having a stearyl group, namely stearic acid, stearates, or complex compounds containing stearic groups. This parchment layer provides a support which prevents sticking or adhesion of products supported thereon. For the purposes of this disclosure the terms "self-releasing" and "adhesion-preventing" are intended to cover parchments containing any one of, or a combination of, the aforementioned releasing ingredients. Suitable parchments are made by the Paterson Parchment Company, and are available as "Patapar 27–20T" and "Patapar 27–21T."

Interposed between and bonding together the base 10 and the parchment 12 is a layer of a non-toxic, odorless adhesive 14, such as a high-polymer, hydrolized vinyl acetate. Adhesives suitable for making this laminated product can be formulated from film formers and combinations of film formers which are non-toxic and free from odor. Such film formers would include natural film formers such as casein, zein, starches and animal glues; or synthetic film formers, such as vinyl-type polymers, synthetic and natural rubbers, polyamides from water solutions, solvent solutions or dispersions. A typical formulation is as follows:

| | |
|---|---|
| Natural rubber latex (60%) | 100.0 |
| Zinc oxide | 2.0 |
| Sulphur | 2.0 |
| Zinc butyl dithiocarbamate | 1.0 |
| Phenylbeta naphthylamine | 0.5 |
| Casein | 20.0 |
| Ammonia (28%) | 2.0 |
| Water | 80.0 |

Referring now to Fig. 2, there is shown a pallet 20, fabricated of the laminate of Fig. 1 in which the semi-rigid base 10 provides the requisite support, the parchment layer 12a allowing for the baking directly thereon at oven temperatures from 350° F. to 500° F. of the baked goods. Subsequent to baking the pallet 20 with the products 22 thereon is removed from the oven and provided with a suitable wrapper, such as the transparent casing 24 which is applied in accordance with well understood techniques.

In Fig. 3 there is shown a receptacle or container 30 which is fabricated of the laminate of Fig. 1. This container includes a bottom 32, side walls 34, 36 and end walls 38, 40 which cooperate to define an upwardly opening tray for the reception of food stuffs 42 to be baked. In the event that the food stuff 42 is to come into contact with all of the internal surfaces of the receptacle or container 30, it is necessary to fabricate the entire container of the laminate with the cardboard base 10b arranged outermost, and with the parchment covering all of the internal faces liable to come into contact with the food stuffs. It is to be expressly understood that the container constructed in accordance with the present invention may be employed not only to bake breads, cakes and pastries, but in addition may be used for baking any of a wide variety of packaged goods following the tendency to pre-cook foods. In the event that the goods will come into contact with the bottom wall 32 only, it is within the contemplation of the present invention that only the bottom wall be of the self-releasing laminate. Subsequent to the baking with the receptacle 30 of Fig. 3, packaging may be completed by employing a complementary sleeve 44 or the like, a transparent wrapper such as shown in Fig. 2 or a removable cover, not shown.

Referring now to Fig. 4, there is shown a further type of receptacle 50 constructed in accordance with the present invention. The receptacle 50 is of well-known construction per se, and is illustrated as a collapsible box including a body proper 52 and a lid or closure 54 swingably supported on the body. In constructing this type of receptacle or container, the usual practice is to begin with an appropriately shaped and scored blank of material which may be folded and joined into the illustrated form. In accordance with the present invention, the blank for the container 50 is formed of the laminate of the present invention and arranged to have the base 10c outermost and the self-releasing parchment layer 12c innermost and in contact with the goods 56 thereon. In employing this container, the box cover or lid 54 is left open and the box placed directly in the oven with the goods therein. Subsequent to the baking, it is merely necessary to remove the box, close the cover and transport the goods to the appropriate outlet. In lieu of an attached cover, it is within the spirit of the present disclosure to employ a separate cover which is placed on the box body 52 after baking.

From the foregoing, it can be seen that the laminate of the present invention facilitates the formation of a wide variety of supports, receptacles and the like for food stuffs to be baked. The physical characteristics of this laminate are such that it will withstand oven temperatures, will not separate, will not give off odors, will not affect the tastes of the food stuffs prepared or baked therein, and has a high degree of grease resistance tending to isolate products supported thereby. Among the substantial advantages derived from employing the laminate is the complete elimination of the necessity of preparing baking pans with grease or the like. It is to be noted that commercial greases prevalently employed in the baking industry have a tendency to impart somewhat of a flavor to the goods which is often to its disadvantage. Additionally, after prescribed periods of time mould may be formed due to the presence of grease, whereas the laminate of the present invention completely eliminates the necessity of grease and the incident flavoring and moulding of the products.

It is to be further noted that receptacles of the laminate when closed provide relatively moisture proof containers preserving the freshness of the food stuffs therein. Additionally, the receptacle may be of leakproof construction due to the non-porous characteristic of the laminate.

While in accordance with the provisions of the statutes we have illustrated and described the best embodiments of my invention now known to me, it is apparent to those skilled in the art that numerous changes may be made in the forms disclosed without departing from the spirit of the invention as set forth in the appended claims and that in some cases certain features of the invention may be used to advantage without a corresponding use of other features.

What we claim is:

1. In a container for baking at oven temperatures, a laminate comprising a semi-rigid cellulosic base, a layer of moderately parchmentized grade of vegetable parchment containing a releasing agent having a stearyl group, and an adhesive of a high-polymer, hydrolized vinyl acetate bonding said layer to said base.

2. A laminate for baking at oven temperatures comprising a semi-rigid cellulosic base, a layer of moderately parchmentized grade of vegetable parchment containing a releasing agent, and an adhesive of high-polymer, hydrolized vinyl acetate bonding said layer to said base.

3. For use as a combined baking, shipping and merchandizing receptacle for goods, a container including at least a bottom wall fabricated of a laminate comprising a semi-rigid cellulosic base, a layer of moderately parchmentized grade of vegetable parchment containing a releasing agent having a stearyl group, and an adhesive of high-polymer, hydrolized vinyl acetate bonding said layer to said base.

References Cited in the file of this patent

UNITED STATES PATENTS

| | | |
|---|---|---|
| 1,203,832 | Wood | Nov. 7, 1916 |
| 1,411,223 | Retzback | Mar. 28, 1922 |
| 1,706,840 | Clapp | Mar. 26, 1929 |
| 1,987,225 | Bergstein | Jan. 8, 1935 |
| 2,051,960 | McCaskell | Aug. 25, 1936 |
| 2,380,043 | Hochwalt | July 10, 1945 |
| 2,387,272 | Klein et al. | Oct. 23, 1945 |
| 2,391,767 | Beerend | Dec. 25, 1945 |
| 2,462,242 | Webb et al. | Feb. 22, 1949 |
| 2,477,787 | Cook | Aug. 2, 1949 |

OTHER REFERENCES

"Beater Sizing With the Silicones," by C. J. Bergendahl and C. E. Libby, published Sept. 4, 1947, in the Paper Trade Journal, vol. 125, No. 10, pages 40–48 inclusive (TAPPI, Sec. 108–116).